(12) United States Patent
Golson, Sr.

(10) Patent No.: US 7,261,631 B1
(45) Date of Patent: Aug. 28, 2007

(54) PORTABLE BIG GAME HOIST ASSEMBLY

(76) Inventor: Curtis L. Golson, Sr., 20804 Scappoose Vernonia Hwy., Scappoose, OR (US) 97056

( * ) Notice: Subject to any disclaimer, the term of this patent is extended or adjusted under 35 U.S.C. 154(b) by 47 days.

(21) Appl. No.: 11/298,487

(22) Filed: Dec. 12, 2005

(51) Int. Cl.
*A22B 1/00* (2006.01)
*A22L 15/00* (2006.01)

(52) U.S. Cl. ...................... 452/187; 452/189

(58) Field of Classification Search .............. 452/185, 452/187, 188, 189, 190, 182; 414/462; 212/180
See application file for complete search history.

(56) References Cited

U.S. PATENT DOCUMENTS

| | | | | |
|---|---|---|---|---|
| 57,876 | A * | 9/1866 | Davis et al. ............... | 452/52 |
| 94,076 | A * | 8/1869 | Chambers et al. .......... | 452/178 |
| 322,181 | A * | 7/1885 | Ketchledge ............... | 414/267 |
| 1,417,234 | A * | 5/1922 | Duke ..................... | 452/189 |
| 1,547,223 | A * | 7/1925 | Lyndale .................. | 452/178 |
| 2,615,584 | A * | 10/1952 | Adams .................... | 212/294 |
| 3,300,186 | A * | 1/1967 | Lee ....................... | 254/334 |
| 3,530,834 | A * | 9/1970 | Freund et al. ............ | 119/728 |
| 3,888,368 | A * | 6/1975 | Hawkins .................. | 414/563 |
| 4,860,404 | A * | 8/1989 | Flachs .................... | 452/187 |
| 5,119,961 | A * | 6/1992 | Runn ..................... | 212/180 |
| 5,211,601 | A | 5/1993 | Cope | |
| 5,284,324 | A * | 2/1994 | Bunger ................... | 254/266 |
| D374,208 | S | 10/1996 | Eva, Jr. | |
| 5,720,400 | A * | 2/1998 | Altizer, Sr. .............. | 212/180 |
| 6,202,868 | B1 | 3/2001 | Murray | |
| 6,250,483 | B1 | 6/2001 | Frommer | |
| 6,554,254 | B2 * | 4/2003 | Vetesnik ................. | 254/325 |
| 6,769,858 | B1 * | 8/2004 | Butler et al. ............. | 414/462 |
| 6,994,618 | B1 * | 2/2006 | Syers ..................... | 452/187 |
| 7,059,956 | B1 * | 6/2006 | Summerlin ................ | 452/192 |

* cited by examiner

*Primary Examiner*—David Parsley

(57) ABSTRACT

A portable big game hoist assembly includes a bottom rod that has a first end and a second end. Each of a pair of bottom couplers is attached to one of the first and second ends. Base supports are attached to and extend laterally away from the bottom couplers. A first and second stanchion each has an upper end and a lower end. Each of the lower ends is coupled to one of the bottom couplers. The first stanchion has an aperture extending therethrough. Top couplers coupled to the upper ends attach a rod to upper ends. A first pulley wheel is mounted on the first stanchion. A second pulley wheel is mounted on the second stanchion. First and second tethers are attached to the first pulley and extend through the aperture. The second tether extends around the second pulley. A support rod is attached to each of the tethers.

11 Claims, 4 Drawing Sheets

PORTABLE BIG GAME HOIST ASSEMBLY

BACKGROUND OF THE INVENTION

1. Field of the Invention

The present invention relates to big game hoist devices and more particularly pertains to a new big game hoist device for lifting big game in the field so that it may be skinned and cleaned.

2. Description of the Prior Art

The use of big game hoist devices is known in the prior art. While these devices fulfill their respective, particular objectives and requirements, the need remains for a device that may be taken apart for easy portability but which also includes adjustable supporting means to allow the device to be erected, in a stable manner, on an uneven ground surface.

SUMMARY OF THE INVENTION

The present invention meets the needs presented above by generally comprising a bottom rod has a first end and a second end. Each of a pair of bottom couplers includes an inwardly extending coupler. The inwardly extending couplers are each pivotally coupled to one of the first and second ends. Each of the bottom couplers includes a pair of laterally extending couplers and an upwardly extending female coupler. Each of a plurality of base supports is removably extended into and is pivotally coupled to one of the laterally extending couplers. The plurality of base supports includes four base supports. A first and second stanchion each has an upper end and a lower end. Each of the lower ends extends into and is removably coupled to one of the upwardly extending female couplers. The first stanchion has an aperture extending therethrough that faces the second stanchion. Top couplers are removably coupled to one of the upper ends and an upper rod is removably attached to and extends between the top couplers. A first pulley wheel is mounted on the first stanchion. A handle is attached to the first pulley wheel. A second pulley wheel is mounted on the second stanchion. A first tether is attached to the first pulley and extends through the aperture and downwardly along the first stanchion. A second tether is attached to the first pulley and extends through aperture, around the second pulley and downwardly along the second stanchion. A support rod has a pair of outer ends. Each of the tethers is attached to the support rod adjacent to one of the outer ends. A plurality of loops is attached to the support rod. An animal may be attached to the loops and lifted upwardly toward the upper rod with the first pulley wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
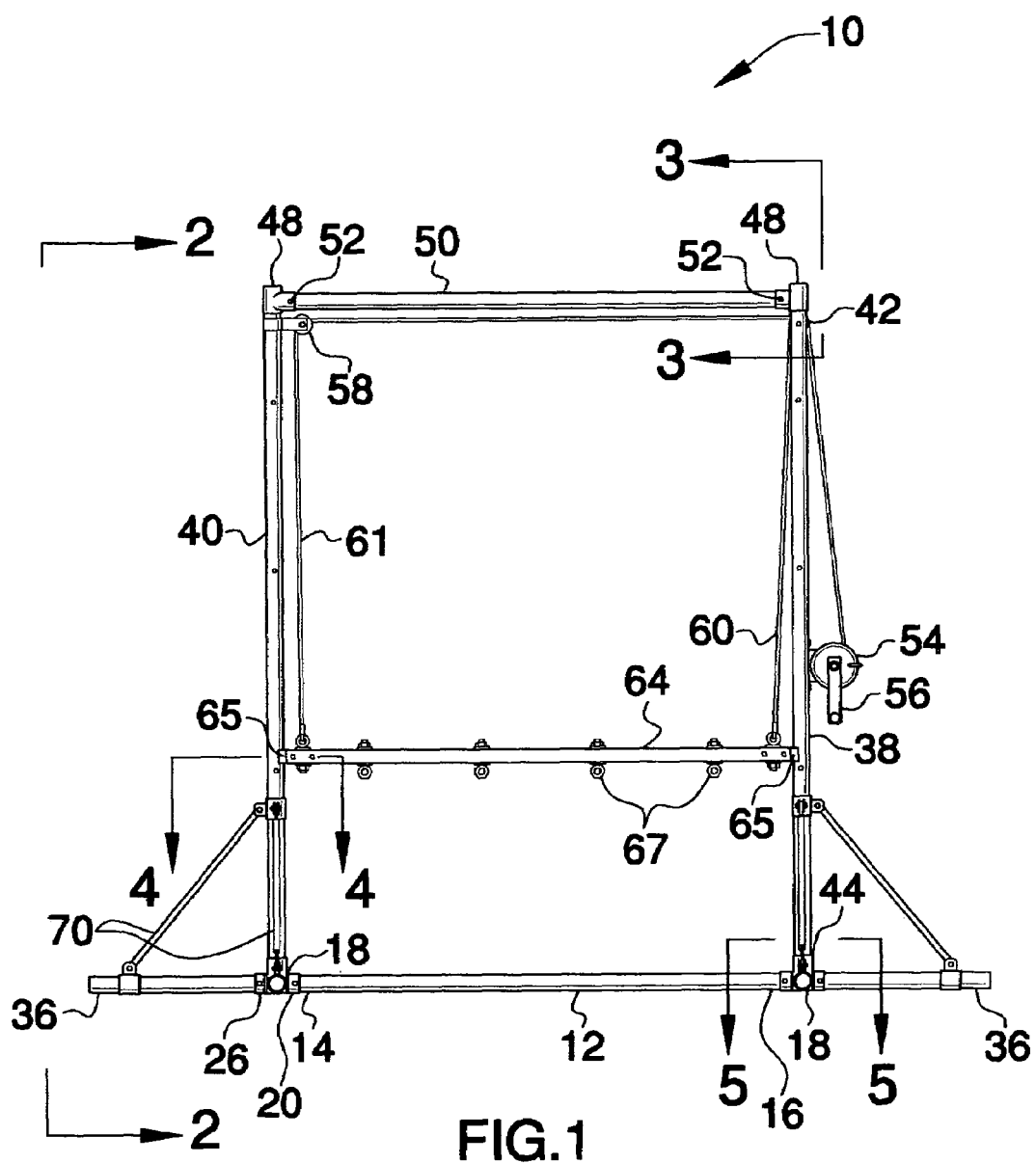
FIG. 1 is a front view of a portable big game hoist assembly according to the present invention.
Figure 2:
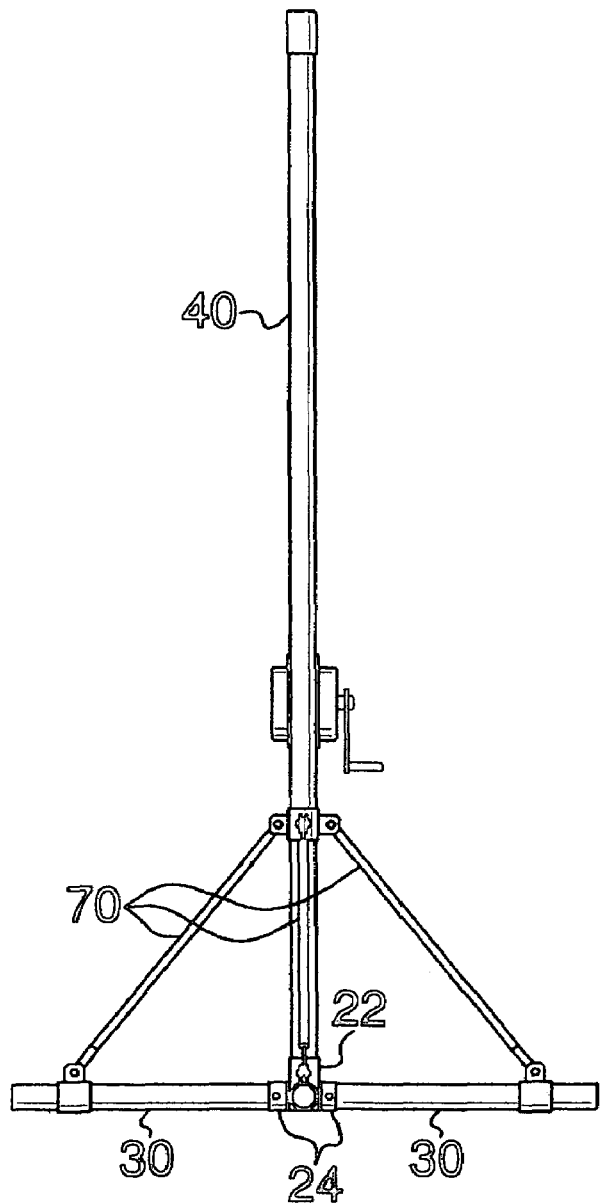
FIG. 2 is a side view taken along line 2—2 of FIG. 1 of the present invention.
Figure 3:
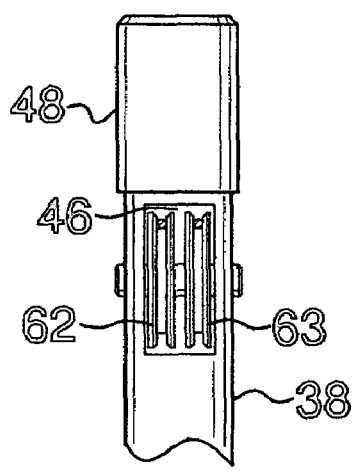
FIG. 3 is a side view taken along line 3—3 of FIG. 1 of the present invention.
Figure 4:
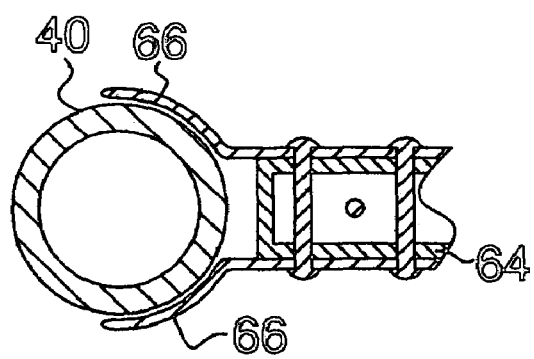
FIG. 4 is a cross-sectional view taken along line 4—4 of FIG. 1 of the present invention.
Figure 5:
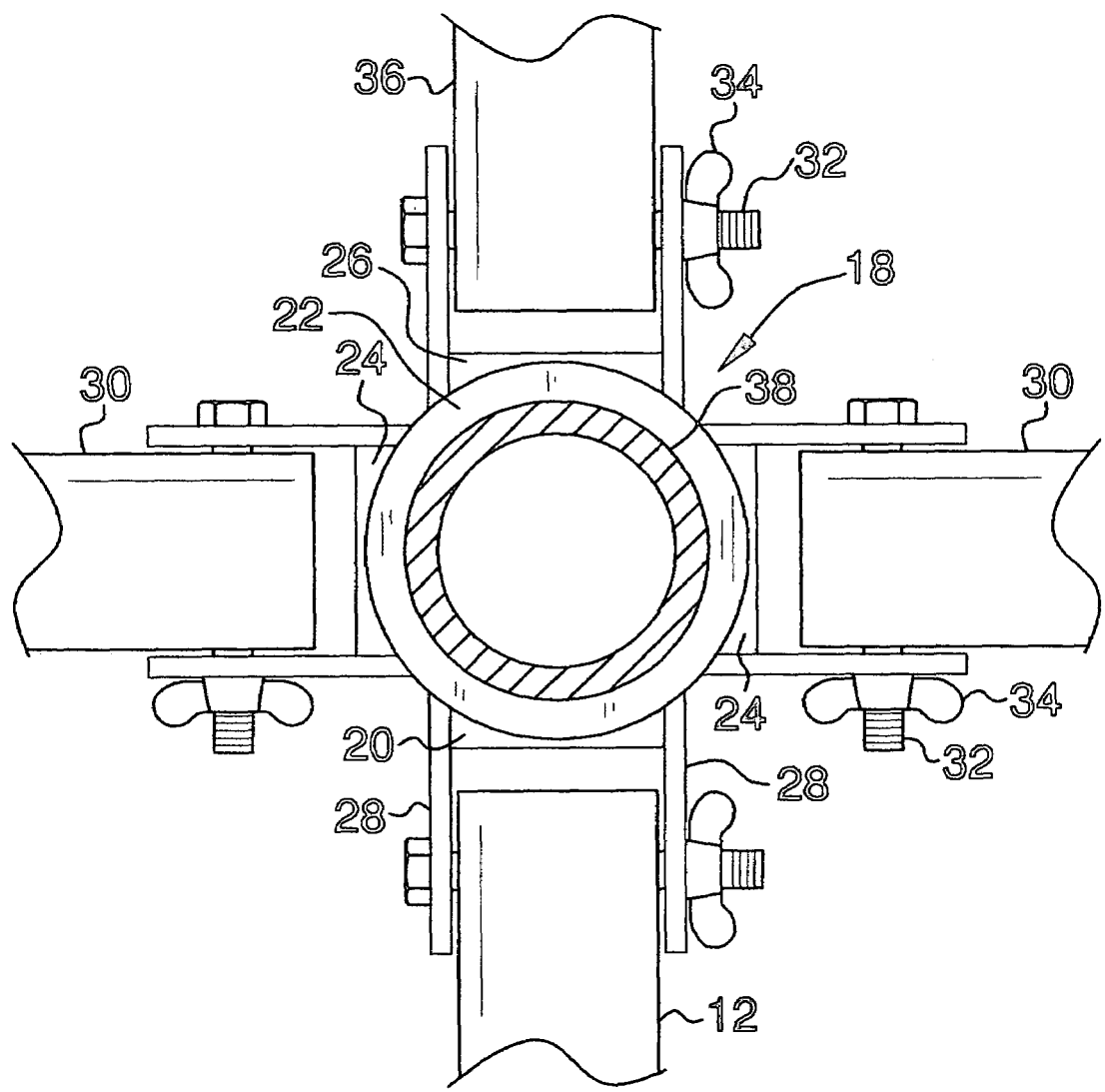
FIG. 5 is a cross-sectional view taken along line 5—5 of FIG. 1 of the present invention.
Figure 6:
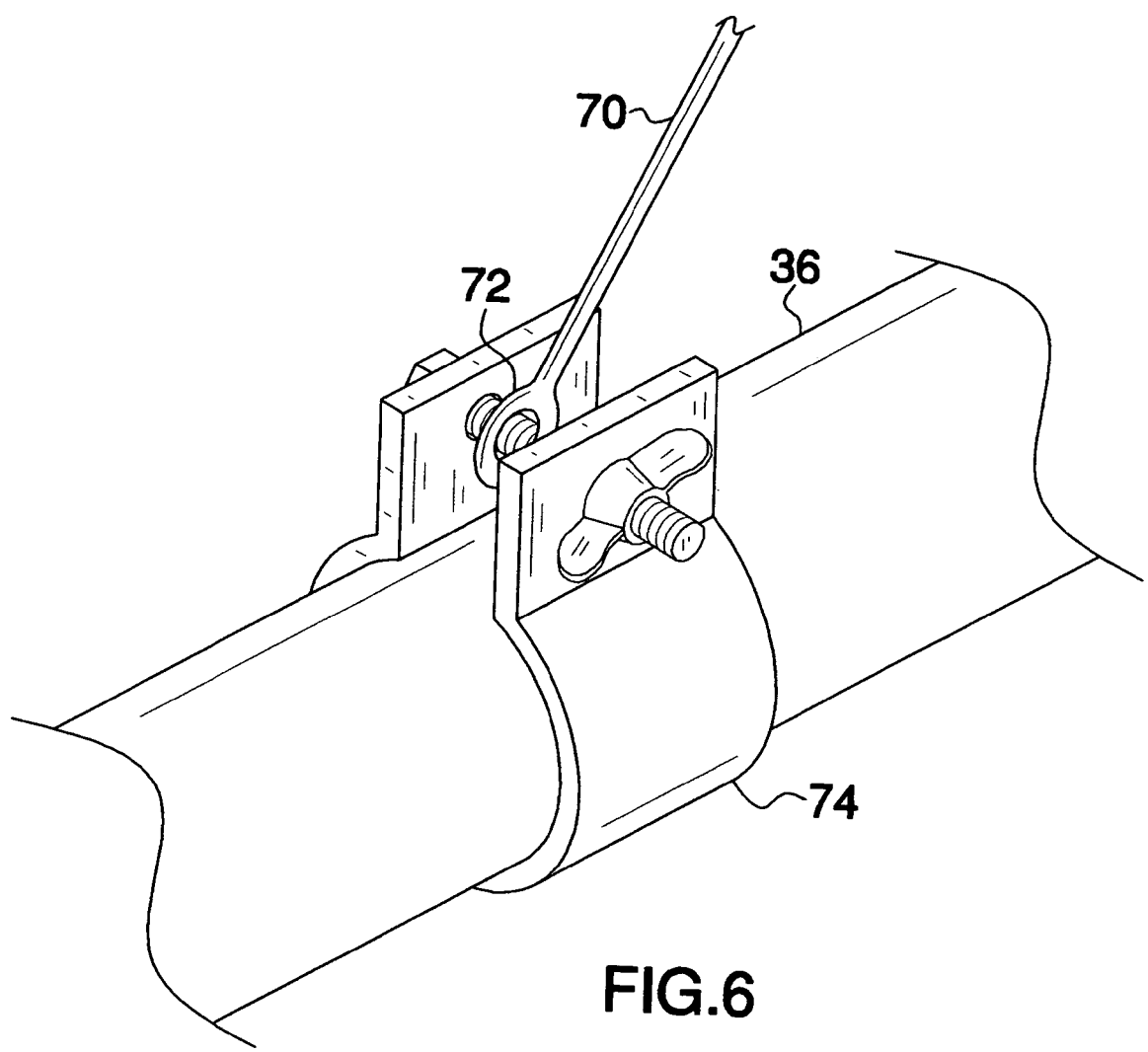
FIG. 6 is a perspective view of a clamp of the present invention.

With reference now to the drawings, and in particular to FIGS. 1 through 6 thereof, a new big game hoist device embodying the principles and concepts of the present invention and generally designated by the reference numeral 10 will be described.

As best illustrated in FIGS. 1 through 6, the portable big game hoist assembly 10 generally comprises a bottom rod 12 having a first end 14 and a second end 16. A pair of bottom couplers 18 is provided. Each of the bottom couplers 18 includes an inwardly extending coupler 20. Each of the first 14 and second 16 ends is pivotally coupled to one of the inwardly extending couplers 20. The bottom couplers 18 each also include an upwardly extending female coupler 22, a pair of laterally extending couplers 24 and a outwardly extending coupler 26 with respect to the bottom rod 12. The outwardly extending couplers 26, inwardly extending couplers 20 and laterally extending couplers 24 comprise a pair of spaced walls 28.

A plurality of base supports 30 is provided. Each of the base supports 30 removably extends into and is pivotally coupled to one of the laterally extending couplers 24. This may be accomplished with a threaded fastener 32 and a nut, such as a wing nut 34. The base supports 30 each substantially lie in a same plane when positioned on a horizontal support surface. The plurality of base supports 30 includes four base supports. Each of a pair of end supports 36 is removably extended into and is pivotally coupled to one of the outwardly extending couplers 26. This may again be accomplished by extending a threaded fastener 32 through the outwardly extending couplers 26 and an associated one of the end supports 36.

A pair of stanchions 38, 40 is provided and each of the stanchions 38, 40 has an upper end 42 and a lower end 44. Each of the lower ends 44 extends into and is removably coupled to one of the upwardly extending female couplers 22. A first stanchion 38 of the pair of the stanchions has an aperture 46 extending therethrough positioned adjacent to the upper end 42 of the first stanchion 38. The aperture 46 substantially faces a second stanchion 40 of the pair of stanchions. Top couplers 48 are removably coupled to the upper ends. An upper rod 50 is removably attached to and extends between the top couplers. Fastening pins 52 may be used to releasably secure the upper rod 50 to the top couplers 48.

A first pulley wheel 54 is mounted on the first stanchion 38. The first stanchion 38 is positioned between the first pulley 54 and the second stanchion 40. The first pulley 54 is positioned between the upper 42 and lower 44 ends of the first stanchion 38. A handle 56 is attached to the first pulley wheel 54. A second pulley wheel 58 is mounted on the second stanchion 40 and is positioned adjacent to the upper end 42 of the second stanchion 40. The second pulley 58 is positioned between the first 38 and second 40 stanchions.

A first tether 60 is attached to the first pulley 54 and extends through the aperture 46 and downwardly along the first stanchion 38. A second tether 61 is attached to the first pulley 54 and extends through aperture 46, around the second pulley 58 and downwardly along the second stanchion 40. A third pulley wheel 62 and a fourth pulley wheel 63 each are rotatably mounted in the aperture 46. Each of the first 60 and second 61 tethers is positioned on one of the third 62 and fourth 63 pulley wheels.

A support rod 64 has a pair of outer ends 65. Each of the tethers 60, 61 is attached to the support rod 64 adjacent to one of the outer ends 65 and each of the outer ends 65 is positioned adjacent to one of the first 38 and second 40 stanchions. The outer ends 65 each include a pair of fingers 66. Each of the first 38 and second 40 stanchions is positioned in a space defined between an adjacent one of the pair of fingers 66. The fingers retain the support rod 64 over the bottom rod 12. A plurality of loops 67 is attached to the support rod 64. Each of the loops 67 extends downwardly from the support rod 64 when the first 60 and second 61 tethers support the support rod 64 above a ground surface.

A plurality of stabilizers 70 is provided. Each of the stabilizers 70 is pivotally coupled to one of the first 38 and second 40 stanchions so that each of the first 38 and second 40 stanchions has three of the stabilizers 70 pivotally coupled thereto. Each of the stabilizers 70 is elongated and has a bottom end 72 terminating in a clamp 74. Each of the clamps 74 is slidably positioned on and selectively securable to one of the base 30 and end 36 supports. Each of the base 30 and end 36 supports has one clamp 74 positioned thereon.

In use, the bottom rod 12, end supports 36 and base supports 30 are attached to the bottom couplers 18 as indicated above and shown in the figures. The end 36 and base 30 supports are pivotally coupled to the bottom couplers 18 so that they can be adjusted depending on the slope of the ground surface upon which they are placed. Once the end 36 and base 30 supports are adjusted to their desired angle, the clamps 74 are tightened to retain the end 36 and base 30 supports at their selected angle with respect to the stanchions 38, 40. The fingers 66 stabilize the support bar 64 and the handle 56 may be used to rotate the first pulley 54 to lift the support rod 64 and an animal, such as deer, upwardly so that it may be cleaned. The loops 67 are used for securing the animal to the support bar 64 with rope.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal hoist and holding apparatus configured for holding an animal while the animal is being skinned, said apparatus comprising:

a bottom rod having a first end and a second end;

a pair of bottom couplers, each of said bottom couplers including an inwardly extending coupler, each of said inwardly extending couplers being pivotally coupled to one of said first and second ends, each of said bottom couplers including a pair of laterally extending couplers and an upwardly extending female coupler;

a plurality of base supports, each of said base supports removably extending into and being pivotally coupled to one of said laterally extending couplers, said plurality of base supports including four base supports;

a pair of stanchions, each of said stanchions having an upper end and a lower end, each of said lower ends extending into and being removably coupled to one of said upwardly extending female couplers, a first stanchion of said pair of said stanchions having an aperture extending therethrough and facing a second stanchion of said pair of stanchions;

a pair of top couplers, each of said top couplers being removably coupled to one of said upper ends;

an upper rod being removably attached to and extending between said top couplers;

a first pulley wheel being mounted on said first stanchion;

a handle being attached to said first pulley wheel;

a second pulley wheel being mounted on said second stanchion;

a first tether being attached to said first pulley and extending through said aperture and downwardly along said first stanchion;

a second tether being attached to said first pulley and extending through aperture, around said second pulley and downwardly along said second stanchion;

a support rod having a pair of outer ends, each of said tethers being attached to said support rod adjacent to one of said outer ends;

a plurality of loops being attached to said support rod; and wherein an animal may be attached to said loops and lifted upwardly toward said upper rod with said first pulley wheel.

2. The apparatus according to claim 1, further including a pair of end supports, each of said bottom couplers includes a outwardly extending coupler with respect to said bottom rod, each of said end supports removably extending into and being pivotally coupled to one of said outwardly extending couplers.

3. The apparatus according to claim 1, wherein said first pulley is positioned between said upper and lower ends of said first stanchion.

4. The apparatus according to claim 3, wherein said second pulley being positioned between said first and second stanchions.

5. The apparatus according to claim 4, further including a third pulley wheel and a fourth pulley wheel each being rotatably mounted in said aperture, each of said first and second tethers being positioned on one of said third and fourth pulley wheels.

6. The apparatus according to claim 1, further including a third pulley wheel and a fourth pulley wheel each being rotatably mounted in said aperture, each of said first and second tethers being positioned on one of said third and fourth pulley wheels.

7. The apparatus according to claim 1, wherein each of said outer ends of said support rod includes a pair of fingers, each of said first and second stanchions being positioned in a space defined between an adjacent one of said pair of fingers.

8. The apparatus according to claim 1, wherein each of said loops extends downwardly from said support rod when said support rod is supported by said first and second tethers.

9. The apparatus according to claim 2, further including a plurality of stabilizers, each of said stabilizers being pivotally coupled to one of said first and second stanchions wherein each of said first and second stanchions has three of said stabilizers pivotally coupled thereto, each of said stabilizers being coupled to one of said base and end supports and being selectively adjustable with respect to an associated one of the base and end supports.

10. The apparatus according to claim 9, wherein each of said stabilizers is elongated and has a bottom end terminating in a clamp, each of said clamps being slidably positioned on and selectively securable to one of said base and end supports wherein each of said base and end supports has one clamp positioned thereon.

11. An animal hoist and holding apparatus configured for holding an animal while the animal is being skinned, said apparatus comprising:

a bottom rod having a first end and a second end;

a pair of bottom couplers, each of said bottom couplers including an inwardly extending coupler, each of said inwardly extending couplers being pivotally coupled to one of said first and second ends, each of said bottom couplers including an upwardly extending female coupler, a pair of laterally extending couplers and a outwardly extending coupler with respect to said bottom rod;

a plurality of base supports, each of said base supports removably extending into and being pivotally coupled to one of said laterally extending couplers, said base supports each substantially lying in a same plane, said plurality of base supports including four base supports;

a pair of end supports, each of said end supports removably extending into and being pivotally coupled to one of said outwardly extending couplers;

a pair of stanchions, each of said stanchions having an upper end and a lower end, each of said lower ends extending into and being removably coupled to one of said upwardly extending female couplers, a first stanchion of said pair of said stanchions having an aperture extending therethrough and positioned adjacent to said upper end, said aperture substantially facing a second stanchion of said pair of stanchions;

a pair of top couplers, each of said top couplers being removably coupled to one of said upper ends;

an upper rod being removably attached to and extending between said top couplers;

a first pulley wheel being mounted on said first stanchion, said first stanchion being positioned between said first pulley and said second stanchion, said first pulley being positioned between said upper and lower ends of said first stanchion;

a handle being attached to said first pulley wheel;

a second pulley wheel being mounted on said second stanchion and being positioned adjacent to said upper end of said second stanchion, said second pulley being positioned between said first and second stanchions;

a first tether being attached to said first pulley and extending through said aperture and downwardly along said first stanchion;

a second tether being attached to said first pulley and extending through aperture, around said second pulley and downwardly along said second stanchion;

a third pulley wheel and a fourth pulley wheel each being rotatably mounted in said aperture, each of said first and second tethers being positioned on one of said third and fourth pulley wheels;

a support rod having a pair of outer ends, each of said tethers being attached to said support rod adjacent to one of said outer ends wherein each of said outer ends is positioned adjacent to one of said first and second stanchions, each of said outer ends including a pair of fingers, each of said first and second stanchions being positioned in a space defined between an adjacent one of said pair of fingers;

a plurality of loops being attached to said support rod, each of said loops extending downwardly from said support rod when said support rod is supported by said first and second tethers;

a plurality of stabilizers, each of said stabilizers being pivotally coupled to one of said first and second stanchions wherein each of said first and second stanchions has three of said stabilizers pivotally coupled thereto, each of said stabilizers being elongated and having a bottom end terminating in a clamp, each of said clamps being slidably positioned on and selectively securable to one of said base and end supports wherein each of said base and end supports has one clamp positioned thereon; and wherein an animal may be attached to said loops and lifted upwardly toward said upper rod with said first pulley wheel.

\* \* \* \* \*